Figure 1:
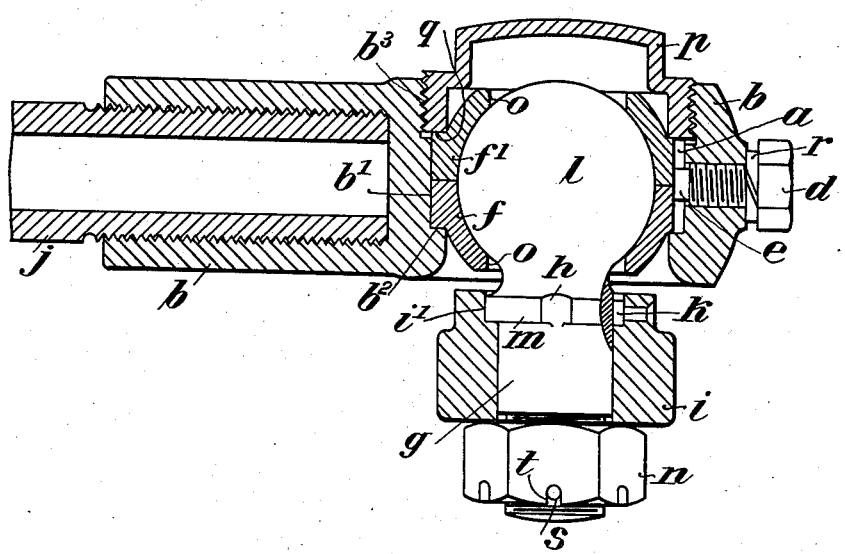

H. MAYER & G. SCHLATTER.
BALL AND SOCKET JOINT.
APPLICATION FILED MAY 25, 1912.

1,073,264.

Patented Sept. 16, 1913.

2 SHEETS—SHEET 1.

WITNESSES:
John C. Sanders
Albert F. Houman

INVENTORS:
Heinrich Mayer
Gustav Schlatter
BY Wm Wallace White
ATTY.

H. MAYER & G. SCHLATTER.
BALL AND SOCKET JOINT.
APPLICATION FILED MAY 25, 1912.

1,073,264.

Patented Sept. 16, 1913.

2 SHEETS—SHEET 2.

WITNESSES:
John C. Sanders
Albert F. Houman

INVENTORS:
Heinrich Mayer
Gustav Schlatter
BY Wm Wallace White
ATT'Y.

UNITED STATES PATENT OFFICE.

HEINRICH MAYER AND GUSTAV SCHLATTER, OF ARBON, SWITZERLAND.

BALL-AND-SOCKET JOINT.

1,073,264.

Specification of Letters Patent.  Patented Sept. 16, 1913.

Application filed May 25, 1912. Serial No. 699,820.

*To all whom it may concern:*

Be it known that we, HEINRICH MAYER and GUSTAV SCHLATTER, both citizens of the Republic of Switzerland, and residing at Arbon, in Switzerland, have invented a new and useful Ball-and-Socket Joint, of which the following is a specification.

The ball-and-socket joints which connect the rods with the arms for turning the fore-wheels of automobiles are liable to strong wear on two opposite sides, so that the globular pivots and their brasses require to be exchanged for new pivots and brasses after a time in order to maintain a safe working of the gear. This means a waste of expensive material and moreover there is the disadvantage, that a considerable number of reserve parts requires to be carried with the automobile for any longer drive.

Our invention relates to improvements in such ball-and-socket joints, whereby the waste of expensive material is reduced and the life of the joint is lengthened.

One improvement consists in making the socket of two like halves, which can be interchanged, whereby the number of reserve parts to be carried with the automobile is reduced.

Another improvement consists in providing the outside of the brasses as well as the outside of a collar on the globular pivot with two notches each, which notches are set at an angle of 90° from one another, and in providing the head or casing for the brasses as well as the arm end carrying the pivot with a pin or other projection adapted to engage in either of the two corresponding notches. Then after the wear of the brasses and of the pivot on two opposite sides it will be possible to turn either the brasses or the pivot alone or both of them at a time through an angle of 90°, so as to expose other sides of the brasses or the pivot, or both of them to the pressure. In this manner the life of the ball-and-socket joint can be lengthened. Where so preferred, the said notches may be provided in the head surrounding the brasses or in the part of the arm end surrounding the collar on the pivot, in which case the pin or projection is provided on the brasses or the collar respectively.

Other improvements will be hereinafter set forth and pointed out in the claims.

We will now proceed to describe our invention with reference to the accompanying drawing, in which—

Figure 2:
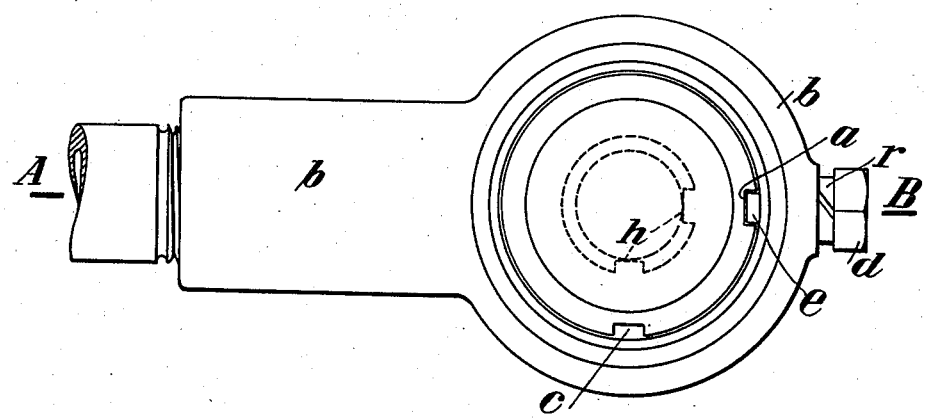
Figure 3:
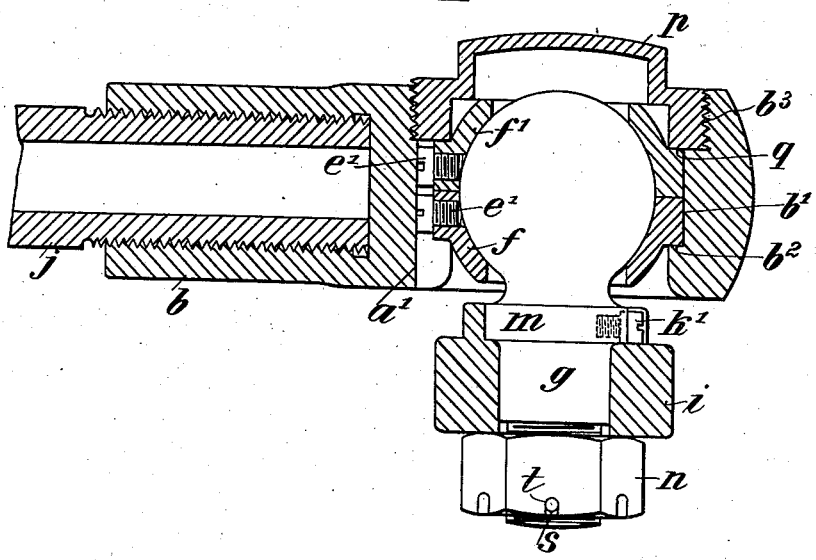
Figure 4:
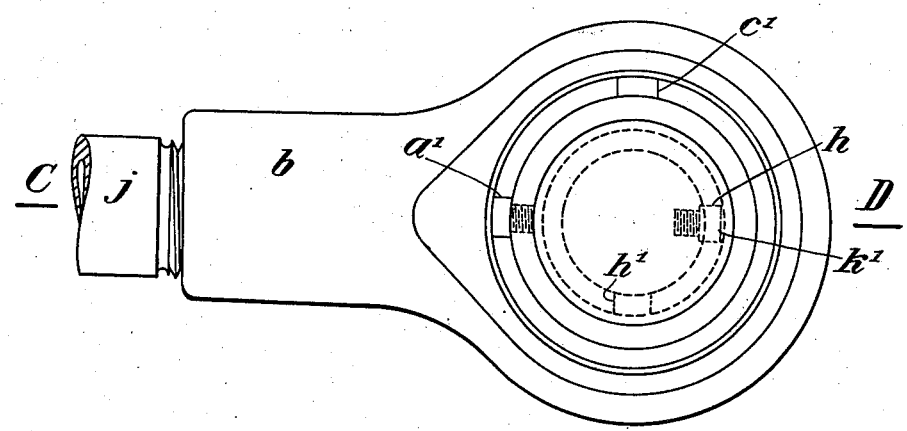

Figure 1 is a vertical longitudinal section through a ball-and-socket joint in the central plane of the globular pivot, that is on the line A—B in Fig. 2, Fig. 2 is a plan view of the same, after the cover and the upper brass have been taken off, Fig. 3 is a vertical longitudinal section through a modified ball-and-socket joint on the line C—D in Fig. 4, and Fig. 4 is a plan view of the same, after the cover and the upper brass have been taken off.

Similar letters of reference refer to similar parts throughout the several views.

$b$ represents a head of a rod $j$, which head has a cylindrical central bore $b^1$, a shoulder $b^2$ below and an internal screw-thread $b^3$ above of a larger diameter than the bore $b^1$.

$l$ represents a globular pivot, the shank $g$ of which together with a collar $m$ is secured in the free end of an arm $i$ by means of a nut $n$. In Figs. 1 and 2 the collar $m$ has according to our invention two notches $h$ $h$ (see Fig. 2) set at an angle of 90° from one another. A pin $k$ is secured on the inside of the annular recess $i^1$ of the arm $i$ by riveting as shown or in any other known manner, the recess $i^1$ fitting the collar $m$ of the pivot $l$. The pin $k$ is made to engage in one of the two notches $h$ $h$, whereby the pivot $l$ is prevented from turning. The brass or bearing for the pivot $l$ is according to our invention made to consist of two like halves $f$, $f^1$, the inner edge $o$ of either of which can be moved over the collar $m$ of the pivot, so that the two halves $f$, $f^1$ can be interchanged. The two bearing pieces $f$, $f^1$ are to come in contact with one another in the central plane of the ball $l$ and of the rod $j$ and the lower piece $f$ is made to bear against the shoulder $b^2$ of the head $b$, while an externally screw-threaded cover $p$ fitting the thread $b^3$ is made to bear against the shoulder $q$ of the upper piece $f^1$. Both bearing pieces $f$, $f^1$ are each according to our invention provided with two notches $a$ and $c$ set at an angle of 90° from one another. The head $b$ is provided with a screw $d$ the inner end $e$ of which is set off and made to engage in the notches $a$ or $c$ of the two bearing pieces $f$, $f^1$, whereby the latter are prevented from turning. The screw $d$ may be in any known manner protected from inadvertent motion, for example by means of a slit ring $r$, and in a similar manner the nut $n$ may be protected from loosening, for example by means of a bent piece of wire introduced through a hole $s$ in the shank $g$ and a groove $t$ in the nut $n$.

It will be evident, that after the two bearing pieces $f$, $f^1$ have been worn on two opposite sides, they can be easily turned through an angle of 90°, so that the end $e$ of the screw $d$ engages in the other notches $c$ or $a$. Then two other opposite sides of the pieces $f$, $f^1$ exactly fitting the pivot $l$ will henceforward take up the thrust. In case also the pivot $l$ should have been worn on two opposite sides, of course both the pivot and the bearing pieces will require to be simultaneously turned through an angle of 90°. Thus both the pivot and the bearing piece can be used for a further time, so that their life is lengthened, before they require to be exchanged for new parts. As the two bearing pieces $f$, $f^1$ can be interchanged, obviously the number of reserve parts to be carried with the automobile is reduced. The ball-and-socket joint may also be modified in that the notches $a$ and $c$ are transferred from the two bearing pieces $f$ $f^1$ to the head $b$ as is shown in Figs. 3 and 4, where the notches $a^1$ and $c^1$ are shown as extending right through the head for facilitating the machining. Then the end $e$ of the screw $d$ is here replaced by two screws $e^1$ $c^1$ which are secured to the two bearing pieces $f$ $f^1$ and both engage in the same notch $a^1$ or $c^1$. In a similar manner the two notches $h$ $h$ in Figs. 1 and 2 may be disposed in the arm end $i$ instead of in the collar $m$, as is marked by $h^1$ $h^1$ in Figs. 3 and 4. In this case a screw $k^1$ may be secured in the collar $m$ and made to engage in either of the notches $h^1$ $h^1$. The effect will be then the same as before. Of course the screws $e^1$ $e^1$ $k^1$ may be replaced by their equivalents.

The ball-and-socket joint may of course be employed for connecting other machine parts.

We claim:

1. In a ball-and-socket joint, the combination with a machine part, of a globular pivot fastened on said machine part and having a collar, a second machine part, two similar interchangeable bearing pieces engaging said globular pivot and being in close contact with each other in said second machine part, each of said two bearing pieces being provided with a central opening the diameter of which is equal to or slightly larger than the diameter of said collar, and means for securing said two bearing pieces in said second machine part in either of two positions set at an angle of 90° from each other.

2. In a ball-and-socket joint, the combination with a machine part, of a globular pivot therein provided with a collar, means for securing said globular pivot on said machine part in either of two positions set at an angle of 90° from each other, a second machine part, two similar interchangeable machine part, two similar interchangeable bearing pieces engaging said globular pivot and being in close contact with each other and being in close contact with each other in said second machine part, each of said two bearing pieces being provided with a central opening the diameter of which is equal to or slightly larger than the diameter of said collar, and means for securing said two bearing pieces in said second machine part in either of two positions set at an angle of 90° from each other.

3. In a ball-and-socket joint, the combination with a machine part, of a globular pivot on said machine part having a collar with two notches set at an angle of 90° from each other, a pin in said machine part adapted to engage in either of the two notches in the collar of said globular pivot, a second machine part, two similar interchangeable bearing pieces engaging said globular pivot and being in close contact with each other in said second machine part, each of said two bearing pieces being provided with a central opening the diameter of which is equal to or slightly larger than the diameter of said collar, and means for securing said two bearing pieces in said second machine part.

4. In a ball-and-socket joint, the combination with a machine part, of a globular pivot on said machine part having a collar with two notches set at an angle of 90° from each other, a pin in said machine part adapted to engage in either of the two notches in the collar of said globular pivot, a second machine part, two similar interchangeable bearing pieces adjustably mounted in said second machine part and engaging said globular pivot and being in close contact with each other and each having on the outside two notches set at an angle of 90° from each other, each of said two bearing pieces being provided with a central opening the diameter of which is equal to or slightly larger than the diameter of said collar, and a pin in said second machine part adapted to engage in either of the two notches of said two bearing pieces.

5. In a ball-and-socket joint, the combination with a machine part, of a globular pivot on said machine part having a collar with two notches set at an angle of 90° from each other, a pin in said machine part adapted to engage in either of the two notches in the collar of said globular pivot, a second machine part having a round hole with a shoulder on one side and an internal screw-thread of larger diameter on the other side, two similar interchangeable bearing pieces engaging on the one hand the round hole of said second machine part and on the other hand said globular pivot and being in close contact with each other and each having on the outside two notches set at an angle of 90° from each other, each of said two bearing pieces being provided with a central opening the diameter of which is equal to or slightly larger than the diameter of said collar, a screw-threaded cover fitting the internal thread of said second machine part and adapted to press said two bearing pieces against the shoulder of said second machine part, and a pin in said second machine part adapted to engage in either of the two notches of said two bearing pieces.

HEINRICH MAYER.
GUSTAV SCHLATTER.

Witnesses:
 RANDALL ATKINSON,
 EUGENE NABEL,
 H. BOITEL.